Figure 1:
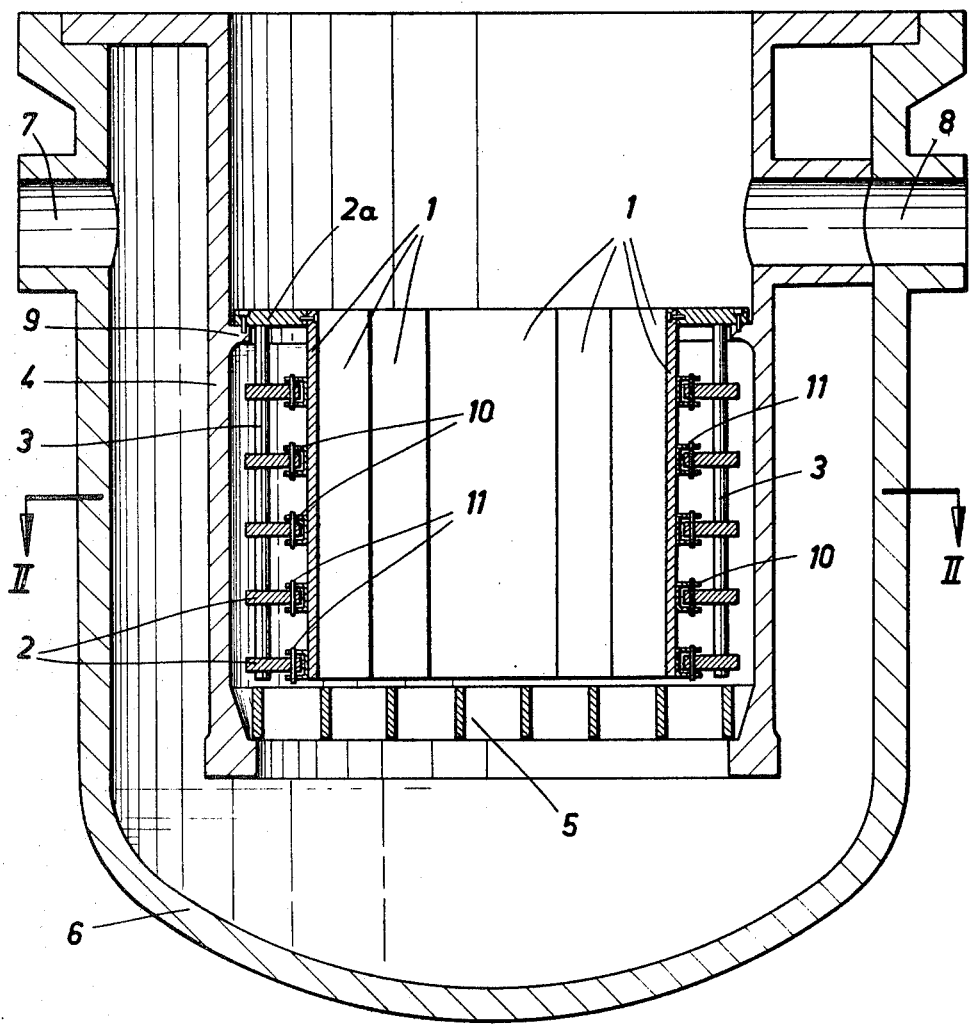

United States Patent
Kaser

[11] 3,720,581
[45] March 13, 1973

[54] INNER SHELL AND SUPPORTING STRUCTURE FOR USE IN A NUCLEAR REACTOR HAVING A REACTOR CORE AND A REACTOR TANK SPACED AROUND SAID CORE

[75] Inventor: Arthur Kaser, Gunskirchen, Austria

[73] Assignee: Vereinigte Osterreichische Eisen-und Stahlwerke Aktiengesellschaft, Linz, Austria

[22] Filed: March 29, 1971

[21] Appl. No.: 129,012

[30] Foreign Application Priority Data

April 30, 1970 Austria....................................3948/70

[52] U.S. Cl..........................................176/87, 220/15
[51] Int. Cl. ................................................G21c 13/04
[58] Field of Search ............................220/15; 176/87

[56] References Cited

UNITED STATES PATENTS 3,093,260   6/1963   Macormack et al....................220/15
3,159,550   12/1964   Laming ...................................176/87

Primary Examiner—Reuben Epstein
Attorney—Kurt Kelman

[57] ABSTRACT

A plurality of vertical inner shell plates form an inner shell and are free of direct interconnections. A plurality of vertically spaced, horizontal section ribs are provided, each of which surrounds said shell. A plurality of vertical posts are connected to said ribs to form therewith a cage adapted to be inserted as a whole into said tank around said core. Each of said inner shell plates is firmly secured to only one of said section ribs and vertically movably guided on all other section ribs.

16 Claims, 6 Drawing Figures

INVENTOR
ARTHUR KASER
BY
Kurt Kelman
AGENT

INNER SHELL AND SUPPORTING STRUCTURE FOR USE IN A NUCLEAR REACTOR HAVING A REACTOR CORE AND A REACTOR TANK SPACED AROUND SAID CORE

This invention relates to an inner shell and supporting structure for nuclear reactors, particularly pressurized-water reactors, which structure comprises vertical inner shell plates, which are not interconnected, and horizontal section ribs extending between the plates and the wall of the reactor tank.

In such reactors, the reactor core composed of individual fuel elements must be contained in an inner shell of stainless steel plates, which guide the flow of the primary cooling water. Because the inner shell plates are heated by the gamma radiation, they may have only a relatively small wall thickness, e.g., of about 16–25 millimeters. Owing to this small thickness of the plates, a supporting structure is required to ensure that the inner shell has the required stability.

In the previous structures, the inner shell plates are bolted to the horizontal section ribs and the latter are bolted to the shell of the reactor tank, which contains the supporting structure. The section ribs have passages, through which the cooling water or part of the cooling water can flow. Because the reactor tank, on the one hand, and the inner shell plates, on the other hand, reach or have different temperatures, there will be differential expansion mainly in a vertical direction so that stresses due to heat arise and the section ribs are spread apart. That known design has the further disadvantage that the entire inner shell and supporting structure around the core must be assembled within the reactor tank because the section ribs must be drilled together with the reactor tank to ensure proper registration.

It has also been proposed rigidly to connect the section ribs by tubes to form a cagelike structure, and to secure the inner shell plates to the inside surface of said cage. Such inner shell and supporting structure around the core may be completed outside the core tank and may then be inserted as a whole into the reactor tank so that the assembling time will be reduced and the transportation will be facilitated because the reactor tank and the inner shell plates are rigidly connected to the section ribs and the latter are rigidly interconnected by the supporting tubes. The stresses due to heat may greatly exceed the limits which are permissible for the materials which are used so that substantial plastic deformation or even fractures may arise at the joints in the supporting structure. Such deformation may be expected during a steady-state operation of the reactor and even fatigue failure must be expected during the load cycles which are usual in the operation of reactors.

It is an object of the invention to eliminate these disadvantages and to provide an inner shell and a supporting structure which is of the kind defined first hereinbefore and in which the occurrence of stresses due to heat is largely avoided during a steady-state or cyclic operation of the reactor whereas the structural expenditure is not greatly increased.

This object is accomplished according to the invention in that a cage is provided, which consists of the section ribs and vertical posts and which can be inserted as a whole into the reactor tank, and each inner shell plate is firmly connected to only one of the section ribs and is vertically movably guided on all other section ribs. In this arrangement, a differential thermal expansion of the inner shell plates, which are not interconnected and at a higher temperature, in the vertical direction relative to the colder section ribs and particularly the vertical posts is not hindered so that stresses due to heat will be avoided. Nevertheless, the inner shell plates will be firmly held because the guides, which are movable only in a vertical direction, will prevent radial and horizontal relative movements between the inner shell plates and the section ribs.

Any desired one of the section ribs may be firmly connected to the inner shell plates. The inner shell plates are preferably firmly connected to the uppermost or lowermost section rib so that the entire inner shell is either suspended from an annular internal projection of the shell of the reactor tank by means of a flangelike uppermost section rib or is supported on a step formed in the shell of the reactor core or on the usual floor grate by means of the lowermost section rib.

Any of several types of joints may be selected to connect the inner shell plates to those section ribs on which the inner shell plates should be vertically movably guided. In a simple joint, the inner shell plates or the section ribs may be provided with vertical guides which are T-shaped or similarly shaped in cross-section and the respective other parts are provided with complementary elements conforming to and interengaging with the guides.

In another design, brackets associated with respective section ribs are secured to the inner shell plates and the section ribs and brackets are joined by vertical guide pins, which are axially slidably mounted at least in one of these two parts.

It will be particularly desirable if a sliding block is slidably mounted in each vertical guide, which is carried by the inner shell plate or the respective section rib, and which is rotatably mounted on a horizontal pin or the like, which is parallel to the associated inner shell plate and carried by the section rib or the inner shell plate, respectively. That arrangement provides for a compensation of any distortion of the inner shell plates. For the same purpose, the sliding surfaces of the sliding block may be cambered.

Figure 2:
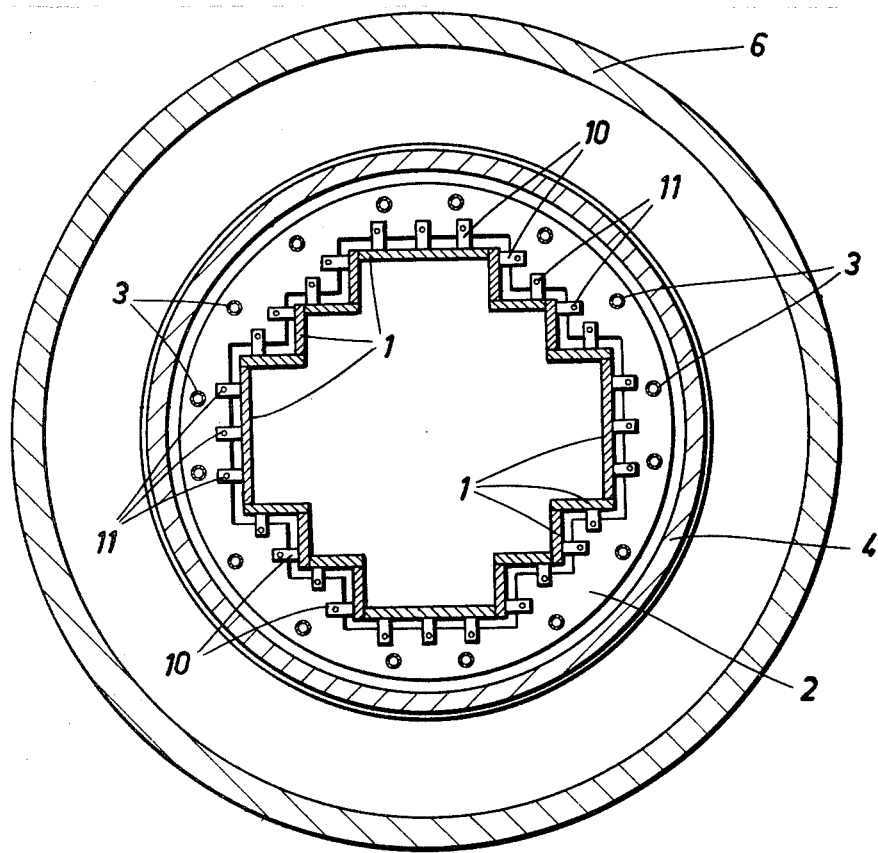
Figure 3:
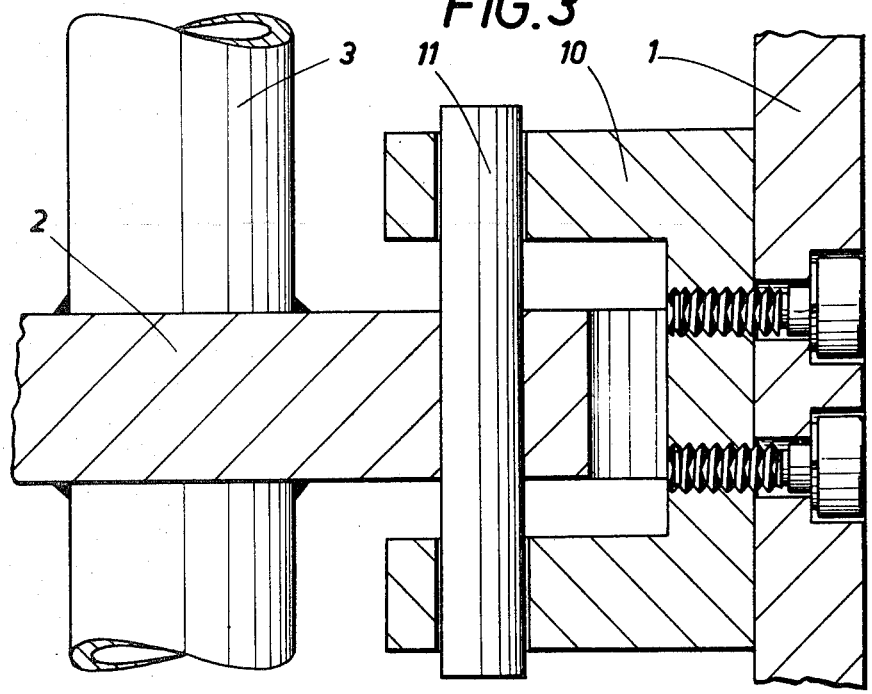
Figure 4:
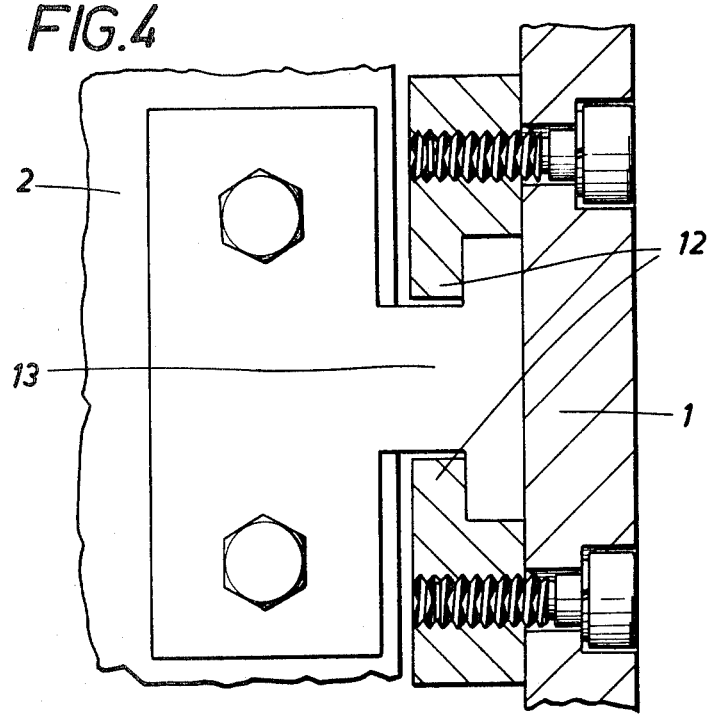
Figure 5:
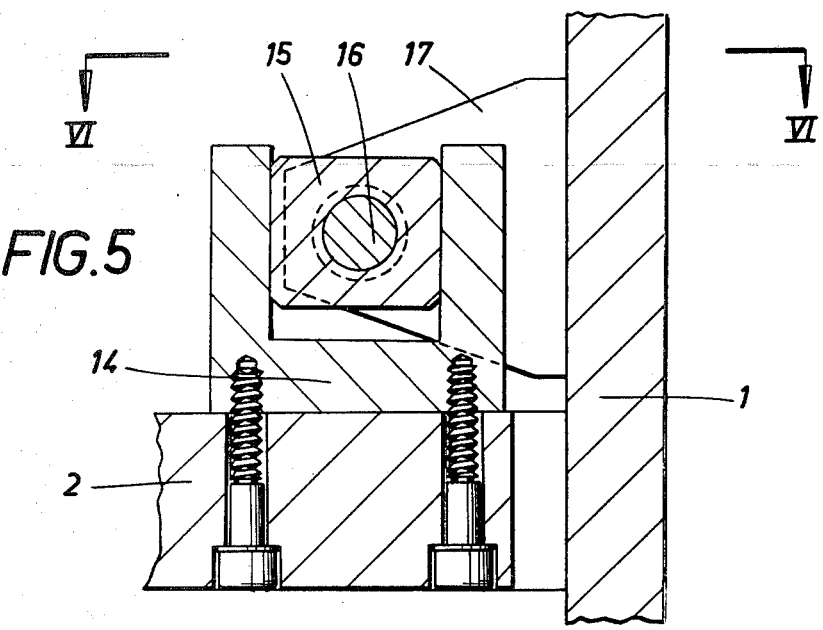
Figure 6:
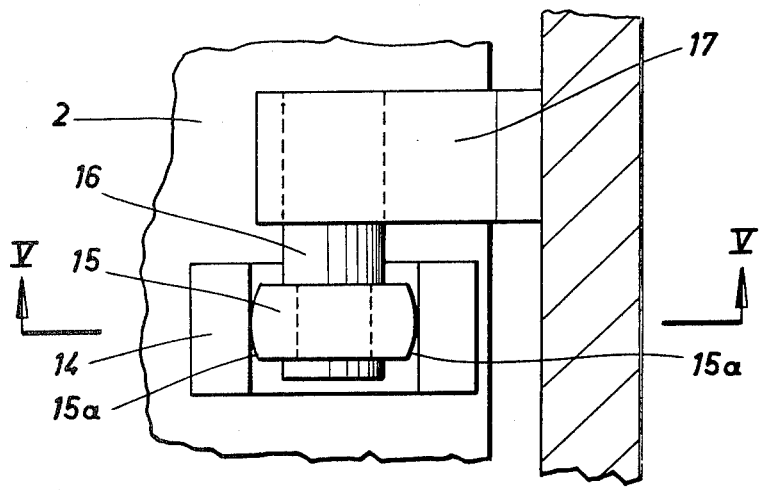

The subject matter of the invention is shown by way of example in the drawing, in which FIG. 1 is a vertical sectional view showing a part of a pressurized-water, nuclear reactor, FIG. 2 is a horizontal sectional view taken on line II—II in FIG. 1, FIG. 3 is an enlarged vertical sectional view showing a detail of the supporting structure for the inner shell surrounding the core, FIG. 4 is a horizontal sectional view on a plane extending between two section ribs and shows a similar detail of a different embodiment, and FIGS. 5 and 6 are sectional views taken on line V—V in FIG. 6 and on line VI—VI in FIG. 5, respectively, and showing a further embodiment.

The inner shell surrounding the reactor core, not shown, comprises vertical inner shell plates 1, which are not interconnected, and horizontal section ribs 2, 2a, which are connected by suitable tubular, vertical posts 3 to form a cage, which can be inserted as a whole into the reactor tank 4. The reactor tank 4 has a floor grate 5 and is held in an outer tank 6. The cooling water enters through the inlet 7, flows upwardly through the floor grate 5 and further through the core and in a partial stream over the outside of the inner shell plates 1 to the outlet 8.

In the embodiment shown in FIGS. 1 to 3, the inner shell plates 1 are firmly connected or bolted only to the uppermost section rib 2a and the latter rests on an annular inner inside shoulder 9 of the core tank 4. The inner shell plates 1 are only vertically movable guided on all other section ribs 2. For this purpose, U-shaped brackets 10 are bolted to the inner shell plates 1 and associated with respective section ribs 2 in such a manner that the section rib is spaced at its top and bottom from the limbs of the U-shaped bracket. The section ribs 2 are connected to the brackets by vertical guide pins 11, which are secured to the section ribs and axially slidably mounted in the limbs of the U-shaped brackets. Alternatively, the guide pins 11 could be secured to the brackets and slidably mounted in the section ribs. If each guide pin has a head which prevents the pin from failing through, the guide pins may be a sliding fit both in the brackets and in the section ribs. The bracket need not both overlie and underlie the associated section rib; it will be sufficient if the bracket overlies or underlies the section rib.

In accordance with FIG. 4, vertical guides consisting of T-section rails 12 are bolted to the inner shell plates 1 and the section ribs 2 carry complementary elements 13, which conform to and interengage with the guides.

In the embodiment shown in FIGS. 5 and 6, U-shaped guide members 14 are secured to the section ribs 2 and a sliding block 15 is slidable between the vertical limbs of said U-shaped guide members and is rotatably mounted on a pin 16, which is parallel to the associated inner shell plate 1. The pin 16 is carried by a bracket 17, which is bolted to the inner shell plate 1. The sliding surfaces 15a of the sliding block 15 are cambered (FIG. 6). Whereas that design results in a positive transmission of radial, horizontal forces between the inner shell plates 1 and the shaped ribs 2, the inner shell plates 1 perform vertical movements relative to the section ribs 2 and will not give rise to stresses even when they are distorted.

The section rib 2a which is secured to the inner shell plates 1 need not be the uppermost section rib. The lowermost section rib may be firmly connected to the inner shell plates and the entire inner shell surrounding the core may rest on the floor grate 5. Any other section rib may be the rib which is firmly secured to the inner shell plates.

What is claimed is:

1. For use in a nuclear reactor having a reactor core and a reactor tank spaced around said core, an inner shell and supporting structure, which comprises
   a plurality of vertical inner shell plates forming an inner shell and free of direct interconnections,
   a plurality of vertically spaced, horizontal section ribs, each of which surrounds said shell, and
   a plurality of vertical posts connected to said ribs to form therewith a cage adapted to be inserted as a whole into said tank around said core,
   each of said inner shell plates being firmly secured to only one of said section ribs and vertically movably guided on all others of said section ribs.

2. An inner shell and supporting structure as set forth in claim 1, in which said inner shell plates are firmly connected to the uppermost of said section ribs.

3. An inner shell and supporting structure as set forth in claim 1, in which said inner shell plates are firmly connected to the lowermost of said section ribs.

4. An inner shell and supporting structure as set forth in claim 1, in which
   said inner shell plates carry vertical guides and
   said other section ribs carry elements which are complementary to and interengage with said guides.

5. An inner shell and supporting structure as set forth in claim 4, in which said guides are T-shaped in cross-section.

6. An inner shell and supporting structure as set forth in claim 1, in which
   said other section ribs carry vertical guides and
   said inner shell plates carry elements which are complementary to and interengage with said guides.

7. An inner shell and supporting structure as set forth in claim 6, in which said guides are T-shaped in cross-section.

8. An inner shell and supporting structure as set forth in claim 1, which comprises
   brackets carried by said inner shell plates and associated with respective ones of said other section ribs, and
   vertical guide pins connecting said other section ribs and brackets and permitting of a relative movement of said other section ribs and brackets in the axial direction of said pins.

9. An inner shell and supporting structure as set forth in claim 8, in which said guide pins are axially slidably mounted in said other section ribs.

10. An inner shell and supporting structure as set forth in claim 8, in which said guide pins are axially slidably mounted in said brackets.

11. An inner shell and supporting structure as set forth in claim 1, which comprises
    a plurality of vertical guides carried by said inner shell plates,
    a plurality of horizontal mounting members carried by said other section ribs, and
    a plurality of sliding blocks, each of which is rotatably mounted on one of said horizontal mounting members and in slidable engagement with one of said guides,
    said horizontal mounting member being parallel to the associated inner shell plates.

12. An inner shell and supporting structure as set forth in claim 11, in which said horizontal mounting members consist of pins.

13. An inner shell and supporting structure as set forth in claim 11, in which said sliding blocks have cambered surfaces in slidable engagement with said guides.

14. An inner shell and supporting structure as set forth in claim 1, which comprises
    a plurality of vertical guides carried by said other section ribs,
    a plurality of horizontal mounting members carried by said inner shell plates, and
    a plurality of sliding blocks, each of which is rotatably mounted on one of said horizontal mounting members and in slidable engagement with one of said guides, said horizontal mounting members being parallel to the associated inner shell plates.

15. An inner shell and supporting structure as set forth in claim 14, in which said horizontal mounting members consist of pins.

16. An inner shell and supporting structure as set forth in claim 14, in which said sliding blocks have cambered surfaces in slidable engagement with said guides.

* * * * *